(12) United States Patent
Hasegawa et al.

(10) Patent No.: US 7,336,413 B2
(45) Date of Patent: Feb. 26, 2008

(54) NONLINEAR FIBER, WAVELENGTH CONVERSION METHOD AND WAVELENGTH CONVERSION DEVICE

(75) Inventors: Tomoharu Hasegawa, Chiyoda-ku (JP); Naoki Sugimoto, Chiyoda-ku (JP); Tatsuo Nagashima, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/589,805

(22) Filed: Oct. 31, 2006

(65) Prior Publication Data

US 2007/0081777 A1 Apr. 12, 2007

Related U.S. Application Data

(63) Continuation of application No. PCT/JP2005/017639, filed on Sep. 26, 2005.

(30) Foreign Application Priority Data

Sep. 29, 2004 (JP) ............... 2004-284466

(51) Int. Cl.
*G02B 6/00* (2006.01)
*G02F 1/35* (2006.01)
*G02F 2/02* (2006.01)

(52) U.S. Cl. ............... 359/326; 359/329; 359/332; 385/122

(58) Field of Classification Search ......... 359/325–332
See application file for complete search history.

(56) References Cited

U.S. PATENT DOCUMENTS

| | | | |
|---|---|---|---|
| 6,560,392 B2 | 5/2003 | Sugimoto et al. |
| 6,599,852 B2 | 7/2003 | Kondo et al. |
| 6,599,853 B2 | 7/2003 | Sugimoto et al. |
| 6,620,748 B1 | 9/2003 | Sugimoto et al. |
| 6,653,251 B2 | 11/2003 | Sugimoto et al. |
| 6,656,584 B1 | 12/2003 | Sugimoto et al. |
| 6,819,860 B2 | 11/2004 | Ohara et al. |
| 2001/0047668 A1 | 12/2001 | Ochiai et al. |
| 2002/0003937 A1* | 1/2002 | Aiso .................. 385/123 |

(Continued)

FOREIGN PATENT DOCUMENTS

EP 0981 189 A2 2/2000

(Continued)

OTHER PUBLICATIONS

29th European Conference on Optical Communication Proceedings, , "Fiber Nonlinear Coefficient Measurement Based on FWM Method with Depolarized Pump Light" K. Kawanami, et al., Sep. 2003, vol. 3 (pp. 552-553).

(Continued)

*Primary Examiner*—Michelle Connelly-Cushwa
*Assistant Examiner*—Rhonda S. Peace
(74) *Attorney, Agent, or Firm*—Oblon, Spivak, McClelland, Maier & Neustadt, P.C.

(57) ABSTRACT

A nonlinear fiber having a third-order nonlinear coefficient of at least 30 $W^{-1}km^{-1}$, and its cladding containing Er or Tm at a portion within 3 μm from the interface with its core. A wavelength conversion method of making a signal light having a wavelength $\lambda_S$ and an intensity $I_S$ and a pump light having a wavelength $\lambda_P$ which is shorter than $2\lambda_S$ and an intensity higher than $I_S$ enter a nonlinear fiber 1, and generating a converted light having a wavelength $\lambda_C$ of $\lambda_S\lambda_P/(2\lambda_S-\lambda_P)$ and an intensity $I_C$ by four wave mixing, wherein Er or Tm is present in the cladding at a portion with a diameter in the nonlinear fiber 1 of at most the mode field diameter, and the converted light is generated by four wave mixing while Er or Tm is excited by an excitation light.

8 Claims, 1 Drawing Sheet

U.S. PATENT DOCUMENTS

| | | | |
|---|---|---|---|
| 2004/0001249 A1* | 1/2004 | Yakabe | 359/341.5 |
| 2006/0100084 A1 | 5/2006 | Nagashima et al. | |
| 2006/0126161 A1* | 6/2006 | Seo et al. | 359/334 |
| 2006/0204191 A1* | 9/2006 | Matthijsse | 385/123 |

FOREIGN PATENT DOCUMENTS

| | | |
|---|---|---|
| JP | 2003-289633 | 12/1991 |
| JP | 2001-213640 | 7/2001 |
| JP | 2003-107540 | 4/2003 |

OTHER PUBLICATIONS

Highly-nonlinear Bismuth oxide-based glass fibers for all-optical signal processing. Kikuchi, K. et al., OF2002, Mar. 2002, (pp. 567-568).

OThA1, "Transparent $Bi_2O_3$-based nonlinear optical fiber with erbium doping", Kasegawa, T., et al, Mar. 2005, vol. 4.

* cited by examiner

NONLINEAR FIBER, WAVELENGTH CONVERSION METHOD AND WAVELENGTH CONVERSION DEVICE

BACKGROUND OF THE INVENTION

1. Field of the Invention

The present invention relates to a wavelength conversion method by four wave mixing, a wavelength conversion device and a nonlinear fiber suitable therefor.

2. Discussion of Background

Various optical signal processing techniques employing a nonlinear fiber having a high third-order nonlinear coefficient ($\gamma$) have been developed, and as one of these techniques, wavelength conversion by four wave mixing (hereinafter referred to as FWM wavelength conversion) may be mentioned.

FWM wavelength conversion is to make a signal light having a wavelength $\lambda_S$ and an intensity $I_S$ and a pump light having a wavelength $\lambda_P$ (provided that $\lambda_P < 2\lambda_S$) and an intensity $I_P$ (provided that $I_P > I_S$) enter a nonlinear fiber having a length L and an absorption coefficient $\alpha$ and to generate a converted light having a wavelength $\lambda_C$ of $\lambda_S\lambda_P/(2\lambda_S-\lambda_P)$ and an intensity $I_C$, and the wavelength conversion efficiency ($\eta$) i.e. $I_C/I_S$ is in proportion to $<\gamma \times I_P \times \{1-\exp(-\alpha \times L)\} \div \alpha>^2$.

For FWM wavelength conversion, usually a silica nonlinear fiber is used as the nonlinear fiber, and for example, $\eta$ of $-28$ dB at $I_P=5$ mW and L=4.43 km has been reported (Kimiya Kawanami et al, Fiber Nonlinear Coefficient Measurement Based on FWM Method with Depolarized Pump Light, 29th European Conference on Optical Communication Proceedings, September 2003, Vol. 3, p. 552-553).

$\gamma$ (hereinafter $\gamma$ represents a third-order nonlinear coefficient for a light having a wavelength of 1,550 nm) of the silica nonlinear fiber for a light having a wavelength of 1,550 nm is typically from 10 to 25 $W^{-1}km^{-1}$, and in order that $\eta$ is higher, use of a nonlinear fiber with a higher $\gamma$ is considered. As such a nonlinear fiber, one made of bismuth oxide glass has been known (for example, JP-A-2001-213640).

The above $\eta$ is usually required to be at least $-40$ dB, and as described above, as FWM wavelength conversion which satisfies this requirement, one employing a silica nonlinear fiber has been known. However, the FWM wavelength conversion has had such problems that it is not easy to find the fiber breakage portion and a compact wavelength conversion device is hardly obtained, since the silica nonlinear fiber has a long L.

On the other hand, if it is attempted to decrease L by using a nonlinear fiber made of the above bismuth oxide glass instead of the silica nonlinear fiber, since the transmission loss of the nonlinear fiber is typically so large as at least 1 dB/m, the signal light, the pump light or the wavelength-converted light (converted light), particularly the pump light tends to be attenuated while it is transmitted through the nonlinear fiber, whereby no desired q tends to be obtained.

SUMMARY OF THE INVENTION

Under these circumstances, it is an object of the present invention to provide a nonlinear fiber, a wavelength conversion method and a wavelength conversion device which will dissolve the above problems.

The present invention provides a nonlinear fiber having a core and a cladding and having a third-order nonlinear coefficient of at least 30 $W^{-1}km^{-1}$ to a light having a wavelength of 1,550 nm, which contains Er or Tm in the cladding at a portion within 3 µm from the interface with the core.

The present invention further provides a wavelength conversion method of making a signal light having a wavelength $\lambda_S$ and an intensity $I_S$ and a pump light having a wavelength $\lambda_P$ which is shorter than $2\lambda_S$ and an intensity higher than $I_S$ enter a nonlinear fiber having a core and a cladding, and generating a converted light having a wavelength $\lambda_C$ of $\lambda_S\lambda_P/(2\lambda_S-\lambda_P)$ and an intensity $I_C$ by four wave mixing, wherein Er or Tm is present in the cladding at a portion with a diameter in the nonlinear fiber of at most the mode field diameter, and the converted light is generated by four wave mixing while Er or Tm is excited by an excitation light.

The present invention further provides a wavelength conversion device (first wavelength conversion device) of making a signal light having a wavelength $\lambda_S$ and an intensity $I_S$ and a pump light having a wavelength $\lambda_P$ which is shorter than $2\lambda_S$ and an intensity higher than $I_S$ enter a nonlinear fiber, and generating a converted light having a wavelength $\lambda_C$ of $\lambda_S\lambda_P/(2\lambda_S-\lambda_P)$ by four wave mixing, wherein the nonlinear fiber is the above nonlinear fiber, and the device has an input terminal for an excitation light to excite Er or Tm present in the cladding of the nonlinear fiber at a portion within 3 µm from the interface with the core.

The present invention still further provides a wavelength conversion device (second wavelength conversion device) of making a signal light having a wavelength $\lambda_S$ and an intensity $I_S$ and a pump light having a wavelength $\lambda_P$ which is shorter than $2\lambda_S$ and an intensity higher than $I_S$ enter a nonlinear fiber, and generating a converted light having a wavelength $\lambda_C$ of $\lambda_S\lambda_P/(2\lambda_S-\lambda_P)$ by four wave mixing, wherein the intensity of the converted light can be made to be at least $(I_S \times 10^{-4})$ even when the pump light intensity is at most 20 mW, and the length of the nonlinear fiber is at most 10 m.

The present inventors have considered that a desired $\eta$ can be obtained in such a manner that the signal light, the pump light or the converted light present in the cladding at a portion near the core of a nonlinear fiber made of a bismuth oxide glass, is amplified by the stimulated emission obtained by exciting Er or Tm contained in the above portion by an excitation light, whereby the amplified light will be transmitted through the core to compensate for the above attenuation of the signal light, the pump light or the converted light, and they have achieved the present invention.

According to the present invention, high efficiency FWM wavelength conversion can be carried out by a short nonlinear fiber.

Further, it is possible to miniaturize a wavelength conversion device capable of carrying out high efficiency FWM wavelength conversion.

Further, in a case where the nonlinear fiber is short, its breakage portion will easily be found.

It is possible to shorten the time (latency) required for signal processing, and higher speed signal processing will be possible.

Figure 1:
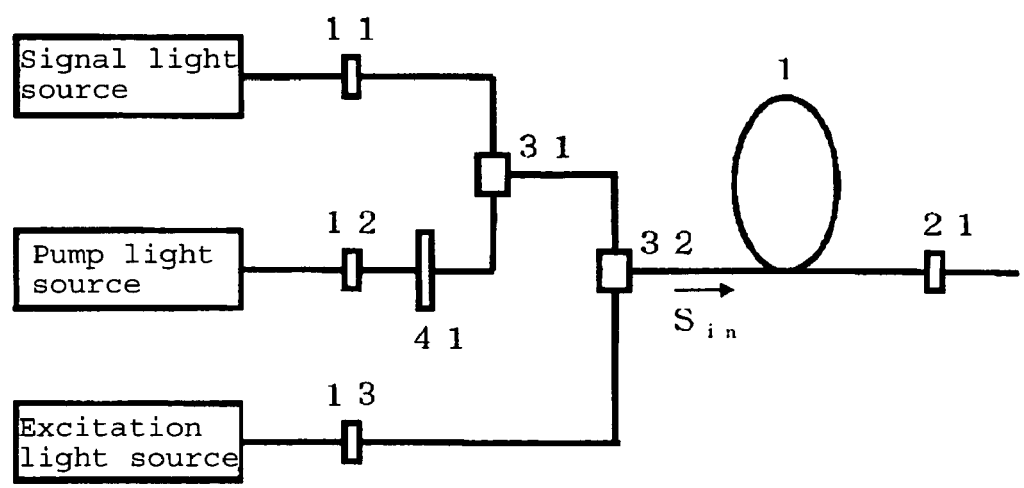
FIG. 1 is a drawing schematically illustrating one example of the structure of a wavelength conversion device of the present invention.

| MEANINGS OF SYMBOLS | |
|---|---|
| 1: | Nonlinear fiber |
| 11, 12, 13: | Input terminal |
| 21: | Output terminal |
| 31, 32: | Optical multiplexer |
| 41: | Wavelength variable filter |
| $S_{in}$: | Signal light |

DETAILED DESCRIPTION OF THE PREFERRED EMBODIMENTS

The nonlinear fiber (hereinafter referred to as a fiber of the present invention) of the present invention has a nonlinear coefficient ($\gamma$) for a light having a wavelength of 1,550 nm of at least 30 $W^{-1}km^{-1}$, and $\eta$ can be increased when it is used for FWM wavelength conversion. $\gamma$ is preferably at least 50 $W^{-1}km^{-1}$, more preferably at least 70 $W^{-1}km^{-1}$.

The fiber of the present invention contains Er or Tm in the cladding at a portion near the core i.e. a portion (hereinafter this portion will be referred to as a core neighborhood portion) within 3 μm from the interface with the core. Er or Tm present in the portion, and in a case where Er or Tm is present in the cladding other than at the portion, said Er or Tm, are excited by an excitation light, and by the resulting stimulated emission, the signal light, the pump light or the converted light at the portion where Er or Tm is present is amplified, and part of the amplified light returns to the core thereby to compensate for the attenuation. As a result, $\eta$ tends to be high as compared with a case where no excitation takes place.

In the fiber of the present invention, the core is preferably made of a glass consisting essentially of from 35 to 50 mol % of $Bi_2O_3$, from 30 to 40 mol % of $B_2O_3+SiO_2$, from 15 to 25 mol % of $Al_2O_3+Ga_2O_3$ and from 0 to 1 mol % of $CeO_2$, and the cladding at a portion within 3 μm from the interface with the core is preferably made of a base glass consisting essentially of from 35 to 50 mol % of $Bi_2O_3$, from 30 to 40 mol % of $B_2O_3+SiO_2$, from 15 to 25 mol % of $Al_2O_3+Ga_2O_3$, and from 0 to 1 mol % of $CeO_2$ and containing Er or Tm.

In a case where it is desired to further increase $\gamma$ of the fiber of the present invention, the core is preferably made of a glass consisting essentially of from 45 to 70 mol % of $Bi_2O_3$, from 12 to 30 mol % of $B_2O_3$, from 7 to 20 mol % of $Ga_2O_3$, from 2 to 15 mol % of $In_2O_3$, from 0 to 15 mol % of ZnO and from 0 to 3 mol % of $CeO_2$, and the cladding at a portion within 3 μm from the interface with the core is preferably made of a base glass consisting essentially of from 45 to 60 mol % of $Bi_2O_3$, from 12 to 30 mol % of $B_2O_3$, from 7 to 20 mol % of $Ga_2O_3$, from 2 to 15 mol % of $In_2O_3$, from 0 to 15 mol % of ZnO and from 0 to 3 mol % of $CeO_2$ and containing Er or Tm.

Here, for example, "the preferred glass constituting the core is a glass consisting essentially of the above components" means that components other than the above components (essential components) may be contained within a range not to impair the object of the present invention, and "from 0 to 3 mol % of $CeO_2$" means that $CeO_2$ is not essential but may be contained up to 3 mol %. In a case where components other than the essential components are contained, the total content of these components is preferably at most 8 mol %.

The fiber of the present invention wherein the cladding at the core neighborhood portion contains Er is suitable for FWM wavelength conversion in a case where the wavelength ($\lambda_S$) of the signal light is from 1,530 to 1,620 nm.

The fiber of the present invention wherein the cladding at the core neighborhood portion contains Tm is suitable for FWM wavelength conversion in a case where $\lambda_S$ is from 1,450 to 1,520 nm.

The portion (hereinafter referred to as an amplification portion) containing Er or Tm in the cladding reaches at least 3 μm from the interface with the core, and the intensity of each of the signal light, the pump light and the converted light present in the core neighborhood portion is typically at least 90% (98% in Example described hereinafter) of each intensity in the entire cladding. Thus, most of the signal light, the pump light and the converted light present in the cladding can be amplified.

In the cladding, the amplification portion may extend to a portion other than the core neighborhood portion, and typically extends to a portion of 8 μm from the core interface, and usually extends to the entire cladding.

In a case where the amplification portion contains Er, its content is preferably at least 40 ppm as represented by mass parts by mass. If the content is less than 40 ppm, the amplification effect may be insufficient, and it is more preferably at least 100 ppm. Further, the content is preferably at most 10,000 ppm. If the content exceeds 10,000 ppm, the amplification effect may decrease due to the upconversion effect, and it is more preferably at most 2,000 ppm.

Now, the wavelength conversion method and the wavelength conversion device of the present invention will be described with reference to FIG. 1. However, the present invention is not limited thereto.

FIG. 1 is a drawing schematically illustrating one example of the structure of a wavelength conversion device of the present invention and one example of the connection of a pump light source, a signal light source and an excitation light source in the one example.

A signal light emitted from a signal light source is input to an input terminal 11 and coupled with a pump light by an optical multiplexer 31, and further coupled with an excitation light by an optical multiplexer 32 and reaches a nonlinear fiber 1.

The signal light wavelength $\lambda_S$ is usually from 1,530 to 1,620 nm, or from 1,450 to 1,520 nm.

In a case where $\lambda_S$ is from 1,530 to 1,620 nm, the nonlinear fiber 1 typically contains Er, and in a case where $\lambda_S$ is from 1,450 to 1,520 nm, the nonlinear fiber 1 typically contains Tm.

The intensity $I_S$ of the signal light $S_{in}$ input to the nonlinear fiber 1 is preferably at least 1 mW in the case of a continuous light. If $I_S$ is less than 1 mW, the intensity of a converted light may be insufficient. $I_S$ is usually from 1 to 100 mW.

The pump light emitted from a pump light source is input to an input terminal 12, coupled with the signal light in the optical multiplexer 31 via a wavelength variable filter 41, and further coupled with the excitation light by the optical multiplexer 32 and reaches the nonlinear fiber 1.

The wavelength $\lambda_P$ of the pump light is longer than $2\lambda_S$, and $|\lambda_P-\lambda_S|$ is usually from 1 to 10 nm.

The intensity $I_P$ of the pump light input to the nonlinear fiber 1 is higher than $I_S$ and it is preferably at least 2 mW in the case of a continuous light. If $I_P$ is less than 2 mW, the wavelength conversion efficiency may decrease. Further, $I_P$ is typically at most 20 mW in the case of a continuous light, but it may be higher than 20 mW when it is desired to further increase the wavelength conversion efficiency.

The excitation light emitted from an excitation light source is input to an input terminal 13 and coupled with the signal light and the pump light in the optical multiplexer 32, and reaches the nonlinear fiber 1 to excite Er or Tm present in the fiber.

The wavelength $\lambda_E$ of the excitation light is typically from 1,475 to 1,485 nm to excite Er in the nonlinear fiber 1 described hereinafter in a case where $\lambda_S$ is from 1,530 to 1,620 nm, or typically from 1,060 to 1,070 nm to excite Tm in the nonlinear fiber 1 described hereinafter in a case where $\lambda_S$ is from 1,450 to 1,520 nm.

In a case where $\lambda_S$ is from 1,530 to 1,620 nm, the excitation light source is suitably a semiconductor laser (LD).

In the wavelength conversion method of the present invention, it is considered that in the nonlinear fiber 1, Er or Tm is present in the cladding at a portion with a diameter of at most the mode field diameter. If neither Er nor Tm is contained in that portion, the above η can not be made high. In a case where $\lambda_S$ is from 1,530 to 1,620 nm, Er is considered to be present, and in a case where $\lambda_S$ is from 1,450 to 1,520 nm, Tm is considered to be present. In the present invention, the mode field diameter is for a light having a wavelength of 1,550 nm, and hereinafter it will be referred to as MFD.

Further, in a case where $\lambda_S$ is from 1,530 to 1,620 nm, Er is present in the cladding at a portion with a diameter of at most MFD in the nonlinear fiber 1, and $\lambda_E$ is typically from 1,475 to 1,485 nm.

Further, in a case where the difference between the core diameter and MFD of the nonlinear fiber 1 is at most 3 μm, the nonlinear fiber 1 is preferably the fiber of the present invention.

Since the nonlinear fiber 1 in the first wavelength conversion device is the fiber of the present invention, the wavelength conversion device can be employed for the wavelength conversion method of the present invention.

The length of the nonlinear fiber 1 is preferably at most 10 m. If it exceeds 10 m, the braking portion may not easily be found, or the wavelength conversion efficiency may decrease due to absorption or dispersion.

In the second wavelength conversion device, the length of the nonlinear fiber 1 is at most 10 m, and the fiber is typically the fiber of the present invention.

The signal light, the pump light and the excitation light are made to simultaneously enter one end of the nonlinear fiber 1, the converted light is generated by FWM wavelength conversion while Er or Tm in the fiber is excited, and the converted light is emitted from the other end of the nonlinear fiber 1.

The wavelength $\lambda_C$ of the converted light is in relation with $\lambda_S$ and $\lambda_P$ represented by the following formula:

$$1/\lambda_C = 2/\lambda_P - 1/\lambda_S$$

The intensity $I_C$ of the converted light emitted from the nonlinear fiber 1 is preferably at least 0.1 μW. If $I_C$ is less than 0.1 μW, the influence of noises may be significant.

η as the ratio of $I_C$ to $I_S$ is preferably at least $10^{-4}$ i.e. at least −40 dB.

The converted light reaches an output terminal 21 and is output.

Although the wavelength variable filter 41 is not essential, in a case where the pump light input to the input terminal 12 is one obtained by amplifying a light from the pump light source, the filter may be used to block the amplified spontaneous emission light (ASE).

Now, the present invention will be described in detail with reference to an Example. However, it should be understood that the present invention is by no means restricted to such a specific Example.

A glass rod made of a glass for core was prepared as follows.

Materials were prepared and mixed so that glass (glass A) having a composition of 43.0 mol % of $Bi_2O_3$, 36.0 mol % of $SiO_2$, 3.5 mol % of $Al_2O_3$, 18.0 mol % of $Ga_2O_3$ and 0.5 mol % of $CeO_2$ would be obtained, to prepare 400 g of a material preparation, and the material preparation was put in a platinum crucible, held in the air atmosphere at 1,150° C. for 2 hours and melted.

The obtained molten glass was poured into a cylindrical mold with a bottom made of SUS310S, having an inner diameter of 15 mm and a height of 180 mm, and annealed to prepare a rod-shape glass. The rod-shape glass was heated and redrawn to prepare a glass rod having a diameter of 3 mm.

The annealing was carried out by holding the molted glass at the glass transition point of the glass i.e. 488° C. for 4 hours and then cooling it to room temperature at a rate of 1° C. per minutes, and the refractive index (n) of the glass for a light having a wavelength of 1,550 nm was 2.03.

Further, two types of glass tubes 1 and 2 were prepared as follows.

Materials were prepared and mixed so that glass (glass B1) being a base glass having a composition of 43.0 mol % of $Bi_2O_3$, 36.0 mol % of $SiO_2$, 7.5 mol % of $Al_2O_3$, 14.0 mol % of $Ga_2O_3$ and 0.5 mol % of $CeO_2$ and containing Er in a content of 150 ppm as represented by mass parts per million, would be obtained, to prepare 400 g of a material preparation, and the material preparation was put in a platinum crucible, held in the air atmosphere at 1,150° C. for 2 hours and melted.

The obtained molten glass was processed by a known rotational casting to prepare a glass tube 1 having an outer diameter of 15 mm, an inner diameter of 7 mm and a eight of 150 mm.

Further, materials were prepared and mixed so that glass (glass B2) having a composition of 43.0 mol % of $Bi_2O_3$, 36.0 mol % of $SiO_2$, 7.5 mol % of $Al_2O_3$, 14.0 mol % of $Ga_2O_3$ and 0.5 mol % of $CeO_2$ would be obtained, to prepare 400 g of a material preparation, and the material preparation was put in a platinum crucible, held in the air atmosphere at 1,150° C. for 2 hours and melted.

The obtained molten glass was processed by known rotational casting to prepare a glass tube 2 having an outer diameter of 15 mm, an inner diameter of 3 mm and a height of 150 mm. The glass transition point of the glass B2 was 494° C., and n was 2.02.

Then, the above glass rod was inserted into the glass tube 1, and they were heated and redrawn while the space between the glass tube 1 and the glass rod was depressurized by a vacuum pump to prepare a two-layer glass rod having a diameter of 5 mm.

The two-layer glass rod was heated again and redrawn to prepare a two-layer glass rod having a diameter of 1.5 mm.

The two-layer glass rod having a diameter of 1.5 mm was inserted into the glass tube 2, and they were heated and redrawn while the space between the glass tube 2 and the two-layer glass rod was depressurized by a vacuum pump to prepare a fiber preform having a diameter of 5 mm. The above heating and redrawing were carried out at a temperature of from 520 to 525° C. using a tubular electric furnace.

The fiber preform thus obtained was heated at 579° C. and spun into thread to prepare a nonlinear fiber having a core diameter of 4.2 μm, a cladding diameter of 125 μm, an MFD of 5.3 μm, γ of 70 $W^{-1}km^{-1}$ and a transmission loss of 2 dB/m. The core of the nonlinear fiber was made of glass A, the layer (first cladding layer) near the core in the cladding of the fiber was made of glass B1 containing Er, the layer (second cladding layer) distant from the core was made of glass B2 containing neither Er nor Tm, and the diameter of the first cladding layer was 12.5 μm. Thus, in the nonlinear fiber, Er is present in the cladding at a portion within 4.15 μm from the interface with the core.

The nonlinear fiber having a length of 10 m was used as the nonlinear fiber 1 in FIG. 1, and the relation between the excitation light intensity $I_E$ (unit: mW) and the wavelength conversion efficiency η (unit: dB) was examined as described hereinafter. Both ends of the nonlinear fiber were melt-connected with a silica single mode fiber HI980 (manufactured by Corning Incorporated) having an MFD of 4.2 μm at a wavelength of 980 nm, and one end of each silica single mode fiber HI980 was preliminarily melt-connected with a silica single mode fiber SMF28 (manufactured by Coring Incorporated) by TEC fusion.

Using LD as a signal light source, a signal light having a wavelength of 1,549 nm was input to an input terminal 11. The intensity $I_S$ of the signal light which entered the nonlinear fiber 1 was 6 mW.

Using LD also as a pump light source, a pump light having a wavelength of 1,550 nm was input to an input terminal 12, and as a wavelength variable filter, TFM-NB-1560-1-S-FC (wavelength full width: 1 nm) manufactured by OYOKODEN K.K. was used. The intensity $I_P$ of the pump light which entered the nonlinear fiber 1 was 56 mW.

Using LD also as an excitation light source, an excitation light having a wavelength of 1,480 nm was input to an input terminal 13.

The intensity of a converted light having a wavelength of 1,551 nm was measured by a spectroscope and a detector (not shown in the drawing) connected with the output terminal 21, and η was calculated. The relation between η and the intensity $I_E$ of the excitation light which entered the nonlinear fiber 1 is shown in Table 1. η at $I_E$ of 350 mW is a value obtained by extrapolation from data of η when $I_E$ is from 0 to 195.0 mW. Further, the calculated values of η at $I_P$ of 20 mW are shown in the section $\eta_{20mW}$.

It is understood from the results that η can be at least −40 dB when $I_E$ is 350 mW even when $I_p$ is 20 mW.

TABLE 1

| | $I_E$ | | | | | | | |
|---|---|---|---|---|---|---|---|---|
| 0 | 18.6 | 66.0 | 112.2 | 134.9 | 158.5 | 177.8 | 195.0 | 350.0 |
| η | −43.0 | −41.2 | −38.3 | −36.5 | −35.7 | −35.1 | −34.7 | −34.3 | −30.7 |
| $\eta_{20mW}$ | −51.9 | −50.1 | −47.2 | −45.4 | −44.6 | −44.0 | −43.6 | −43.2 | −39.6 |

The present invention is applicable to optical signal processing such as FWM wavelength conversion.

The entire disclosure of Japanese Patent Application No. 2004-284466 filed on Sep. 29, 2004 including specification, claims, drawings and summary is incorporated herein by reference in its entirety.

What is claimed is:

1. A nonlinear fiber comprising a core and a cladding wherein a third-order nonlinear coefficient is at least 30 $W^{-1}$ $km^{-1}$ to a light having a wavelength of 1,550 nm, and the cladding at a portion within 3 μm from the interface with the core comprises Er or Tm.

2. The nonlinear fiber according to claim 1, wherein the core comprises glass consisting essentially of 35 to 50 mol % of $Bi_2O_3$, from 30 to 40 mol % of $B_2O_3+SiO_2$, from 15 to 25 mol % of $Al_2O_3+Ga_2O_3$ and from 0 to 1 mol % of $CeO_2$, and the cladding at a portion within 3 μm from the interface with the core comprises a base glass consisting essentially of 35 to 50 mol % of $Bi_2O_3$, from 30 to 40 mol % of $B_2O_3+SiO_2$, from 15 to 25 mol % of $Al_2O_3+Ga_2O_3$ and from 0 to 1 mol % of $CeO_2$ and Er or Tm.

3. The nonlinear fiber according to claim 1, wherein the clad at a portion within 3 μm from the interface with the core comprises Er in a content of at least 40 ppm as represented by mass percentage.

4. A wavelength conversion method comprising causing a signal light having a wavelength $\lambda_S$ and an intensity $I_S$ and a pump light having a wavelength $\lambda_S$ which is shorter than $2\lambda_S$ and an intensity higher than $I_S$ to enter a nonlinear fiber having a core and a cladding, and generating a converted light having a wavelength $\lambda_C$ of $\lambda_S\lambda_P/(2\lambda_S-\lambda_P)$ and an intensity $I_C$ by four wave mixing, wherein Er or Tm is present in the cladding at a portion with a diameter in the nonlinear fiber of at most the mode field diameter, and the converted light is generated by four wave mixing while Er or Tm is excited by an excitation light.

5. The wavelength conversion method according to claim 4, wherein the difference between the core diameter and the mode field diameter of the nonlinear fiber is at most 3 μm, and the nonlinear fiber is a nonlinear fiber comprising a core and a cladding wherein a third-order nonlinear coefficient is at least 30 $W^{-1}$ $km^{-1}$ to a light having a wavelength of 1,550 nm, and the cladding at a portion within 3 μm from the interface with the core comprises Er or Tm.

6. The wavelength conversion method according to claim 4, wherein $\lambda_S$ is from 1,530 to 1,620 nm, Er is present in the cladding at a portion with a diameter in the nonlinear fiber of at most the mode field diameter, and the wavelength of the excitation light is from 1,475 to 1,485 nm.

7. A wavelength conversion device of making a signal light having a wavelength $\lambda_S$ and an intensity $I_S$ and a pump light having a wavelength $\lambda_P$ which is shorter than $2\lambda_S$ and an intensity higher than $I_S$ enter a nonlinear fiber, and generating a converted light having a wavelength $\lambda_C$ of $\lambda_S\lambda_P/(2\lambda_S-\lambda_P)$ by four wave mixing, wherein the nonlinear fiber is the nonlinear fiber as defined in claim 1, and the device has an input terminal for an excitation light to excite Er or Tm present in the cladding of the nonlinear fiber at a portion within 3 μm from the interface with the core.

8. A wavelength conversion device of making a signal light having a wavelength $\lambda_S$ and an intensity $I_S$ and a pump light having a wavelength $\lambda_P$ which is shorter than $2\lambda_S$ and an intensity higher than $I_S$ enter a nonlinear fiber, and generating a converted light having a wavelength $\lambda_C$ of $\lambda_S\lambda_P/(2\lambda_S-\lambda_P)$ by four wave mixing, wherein the intensity of the converted light is made to be at least $I_S \times 10^{-4}$ even when the pump light intensity is at most 20 mW, and the length of the nonlinear fiber is at most 10 m.

* * * * *